United States Patent [19]

Le Merer et al.

[11] 3,909,608

[45] Sept. 30, 1975

[54] REPRODUCING DEVICE FOR THE OPTICAL READING OUT OF A RECORD CARRYING AN EMBOSSED PRINT

[75] Inventors: Jean Pierre Le Merer; Francois Le Carvennec; Jean Pierre Lacotte; Roland Malissin; Claude Puech; Claude Tinet, all of paris, France

[73] Assignee: Thomson-CSF, Paris, France

[22] Filed: Dec. 18, 1973

[21] Appl. No.: 425,793

[30] Foreign Application Priority Data

Dec. 26, 1972 France ............................ 72.46189

[52] U.S. Cl. .......... 250/202; 179/100.3 G; 250/570

[51] Int. Cl.$^2$. G06K 7/10; G06K 11/02; G11B 7/00

[58] Field of Search ..... 250/570, 202; 179/100.3 G, 179/100.3 N, 100.3 V; 178/6.6 DD; 274/41.6 S

[56] References Cited

UNITED STATES PATENTS

| | | | |
|---|---|---|---|
| 3,198,949 | 8/1965 | Holdo | 250/202 |
| 3,207,904 | 9/1965 | Heinz | 250/202 |
| 3,715,524 | 2/1973 | Adler | 250/202 X |

*Primary Examiner*—James W. Lawrence
*Assistant Examiner*—T. N. Grigsby
*Attorney, Agent, or Firm*—Cushman, Darby & Cushman

[57] ABSTRACT

The invention relates to optical systems for reproducing information-bearing signals recorded upon a record in the form of a track of diffractive elements. The optical detection with a luminous spot is performed by means of four photodetector elements arranged side by side; the two sets of symmetrical elements are respectively connected to two differential amplifiers.

3 Claims, 4 Drawing Figures

REPRODUCING DEVICE FOR THE OPTICAL READING OUT OF A RECORD CARRYING AN EMBOSSED PRINT

The present invention relates to optical systems for reproducing from a record information-bearing signals stored along a track exhibiting irregularities in the form of depressions or projections, which correspond with the time variation in the signals carrying said information.

In straight or curved tracks of this kind, the time variation in information-bearing signals is materially represented by irregularities, hollows or projections, in the surface of the substrate; the detection of these surface irregularities, is effected by optical read out of the tracks: a read-out light beam, converging on to a track, is diffracted by the surface irregularities and the detection of the spatial variation in illumination, which results from this, indicates the presence or absence of and, consequently represents, said recorded signals.

The detection means used in prior art devices are constituted by two photodetector elements disposed symmetrically in relation to the direction of transfer of the track, substantially at right angles to the direction of the read-out light beam. There is formed upon the photodetectors a light spot whose size varies in accordance with whether or not there is an irregularity at the surface of the track being read out. These photodetectors are connected on the one hand to an adder circuit supplying a signal which indicates whether or not there is a surface irregularity present, and on the other hand to a differential amplifier supplying an error signal which makes it possible to control the position of the read-out beam to accord with that of the track, this in the event of inadvertent displacement of the latter transversely of its direction of transfer.

If the surface irregularities are of short length, that is to say of an order of magnitude close to their width, this kind of detection method has only a low signal-to-noise ratio, and consequently, its reliabitity is not so good.

The object of the present invention is an optical system for reproducing a diffractive track recording, which makes it possible to overcome the aforementioned drawbacks by the utilisation of a device wherein detection of said surface irregularities is effected by spatial variation of the diffracted energy emerging from each of the two ends of said irregularities.

In accordance with the present invention, there is provided a reproducing device for the reading out of a pulse time modulated waveform stored onto a record in the form of an embossed print having an axis, and carried by an engraved face of said record; said print being of uniform width, and constituted along said axis by a succession of diffractive elements having non-uniform length and spacing at least equal to said width; said reproducing device comprising; illumination means for projecting a concentrated spot of radiant energy onto said embossed print, photoelectric detection means arranged for selectively collecting the diffracted radiant energy emerging from the portion of said embossed print illuminated by said concentrated spot, and moving means arranged for following with said concentrated spot the path of said emobssed print; said photoelectric detection means comprising four photodetector elements arranged side by side and supplied symmetrically with said diffracted radiant energy.

For a better understanding of the present invention and to show how the same may be carried into effect reference will be made to the following description and the attached figures, among which:

Figure 1:
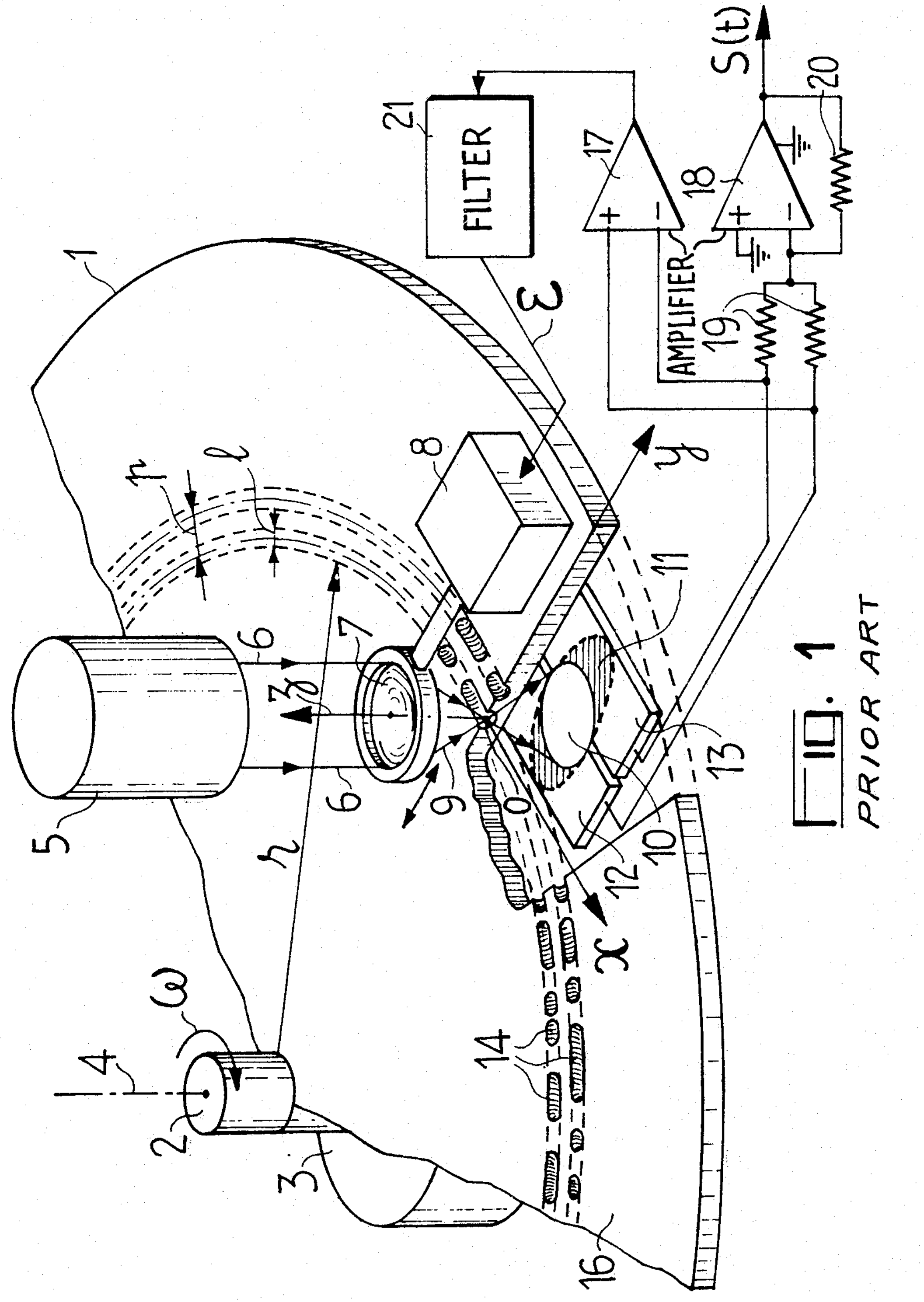
FIG. 1 PRIOR ART
FIG. 1 is a view of a prior art optical reproduction system.

FIG. 1 illustrates a record 1 in the form of a circular disc which can rotate in its own plane, at an axis 4, thanks to the provision of a drive pin 2 mechanically connected to a motor 3. The bottom face of the disc 1, parallel to the plane x o y, is assumed to be smooth, and the top face 16, parallel to the latter is also smooth but contains a succession of diffractive elements 14 in the form of depressions or projections, arranged in the form of the turns 15 of a spiral track. Each of the elements 14 has a contour, in the plane of the face 16, of more or less elongated shape, the width 1 of which is substantially constant and does not exceed two microns. The element 14 can take the form of a shallow trough hollowed out of the surface of the face 16, or of a bead. The incorporation of the data into the modulation signal is carried out, as required, by frequency of phase-modulation or by any other coding method capable of producing a pulse-coded message.

The record 1, in FIG. 1, has been assumed transparent so that it can be read out by transmission.

Self-evidently, the shape of the record 1 is in no way limitative; a record of tape form, containing one or more rectilinear tracks, is conceivable, and in the case of a circular disc, instead of the spiral track a set of concentric circular tracks could be substituted, giving step-by-step access to the recorded data.

In addition to the record 1 and its drive system, FIG. 1 also shows the optical read-out device employed in relation to the track 15. This read-out device is essentially constituted by a light source 5 and an objective lens 7. The source 5, parallel to the axis *oz*, produces substantially parallel light beams 6 and the microscope objective lens 7 causes the beam 6 to converge at the point O on the track 15. The light rays 9 which converge towards the point O, intersect and diverge beyond said point; after having passed through the disc 1, a fragment of which has been removed in order to simplify the drawing, they illuminate an area 10 which overlaps to a greater or lesser extent the receiving surfaces of two side-by-side photodetector elements 12 and 13. The space separating the receiving surfaces of the photodetector elements 12 and 13, is located plumb in line with the direction oz and orientated along the axis of the track, tangentially to ox at the read-out point O.

The photodetector elements 12 and 13 furnish electrical signals which are applied respectively to the inputs of a first differential amplifier 17. The output of the amplifier 17 is connected to a low-pass filter 21. This filter 21 supplies an error voltage $\epsilon$ which, through the medium of an electromechanical transducer 8, controls the radial displacement in the *o y* direction, of the objective lens 7. The electrical signals furnished by the photodetectors 12 and 13 are also applied to resistors 19, which, with the resistor 20 and the operational amplifier 18, constitute an electrical transmission circuit furnishing a signal $S(t)$ proportional to the sum of the signals produced by the two photodetectors 12 and 13.

When the point of convergence O of the beam 9 encounters the surface 16 between two diffractive elements 14 succeeding one another on the track 15, no diffraction occurs and the light energy received by the photodetector elements 12 and 13 is confined to the interior of the area 10.

By contrast, as soon as the point of convergency O of the beam encounters a diffractive element 14 on the record 1, the light experiences substantial diffraction, this tending to distribute the light energy over a cross-hatched area 11 which substantially exceeds the area 10. The result is a variation in the sum $S(t)$ of the signals furnished by the two photodetector elements 12 and 13. At the time of passage of the elements 14, there is picked up at the output of the amplifier 18 a signal S($t$) of squarewave form, which faithfully translates the time variations in the signal engraved in the track 15.

Figure 2:
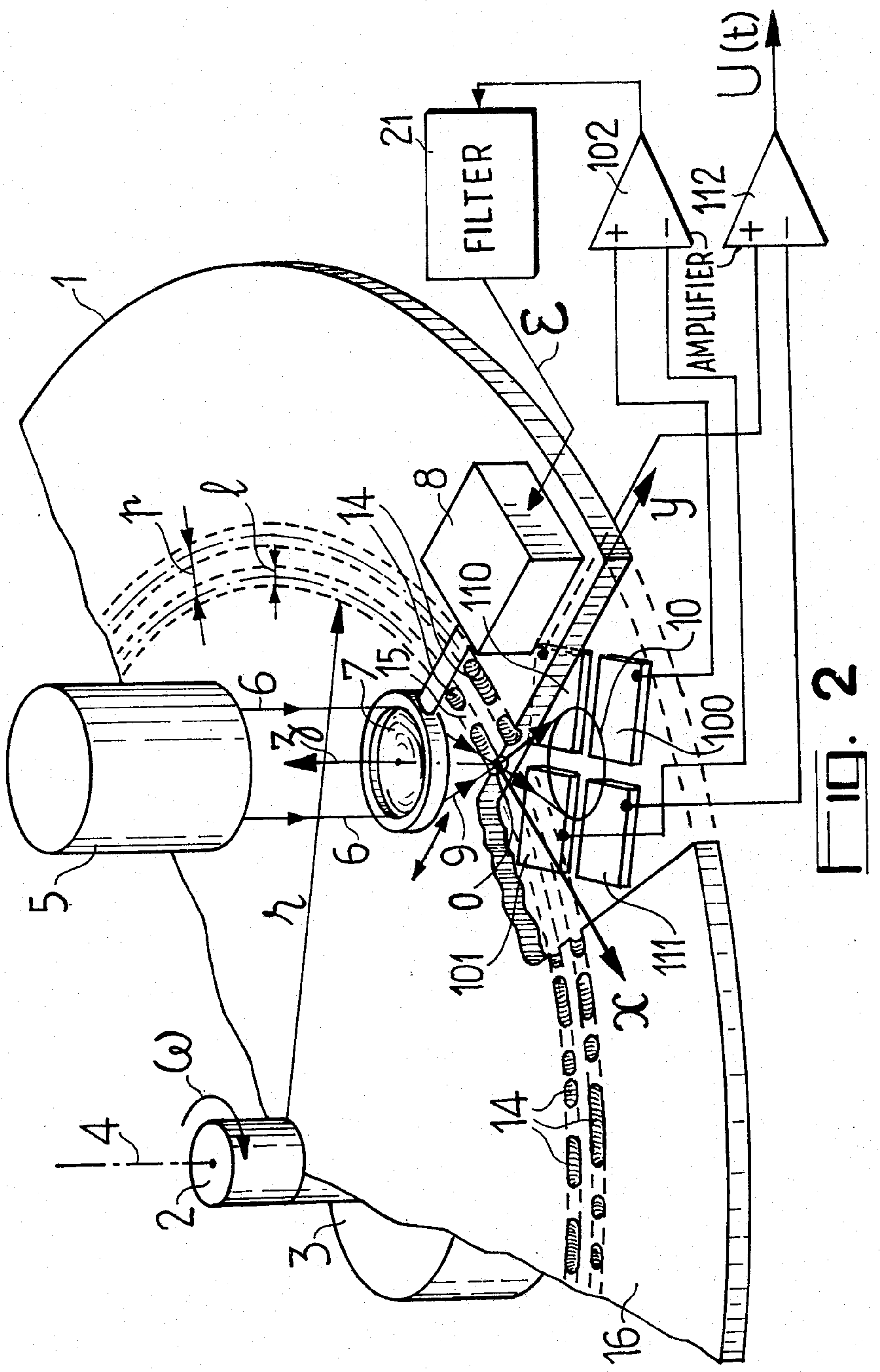
FIG. 2 is a view of a modified optical reproduction system in accordance with the invention.

In FIG. 2, where the reference numbers designate similarly marked elements, there can be seen an optical system in accordance with the present invention.

The optical read-out system for this recording, incorporates detection means (100, 101, 110, and 111) for optically detecting the signal stored onto the substrate 1.

These modified detection means are constituted by four photodetectors: 100, 101, 110, 111, grouped in a plane parallel to the plane XOY, about the axis OZ. Two of these detectors, 110 and 111, are disposed symmetrically in relation to the axis OX, and it is pointed out that the latter is aligned with the radius of disc 1, passing through point O. These detectors are repsectively connected to the two inputs of a differential amplifier 112, whose output furnishes a signal U($t$) in accordance with a mechanism described hereinafter. The two other photodetectors 100 and 101, are disposed symmetrically to either side of the axis OX, and it is pointed out that the latter represents the direction of transfer of the track; they are respectively connected to the two inputs of a differential amplifier 102, whose output is connected to the low-pass filter 21 which latter furnishes to the electromechanical transducer 8 the error signal $\epsilon$ which enables the lens 7 to be controlled to accord with the position of the track 13, as illustrated in FIG. 3 of the present invention.

Figure 3:
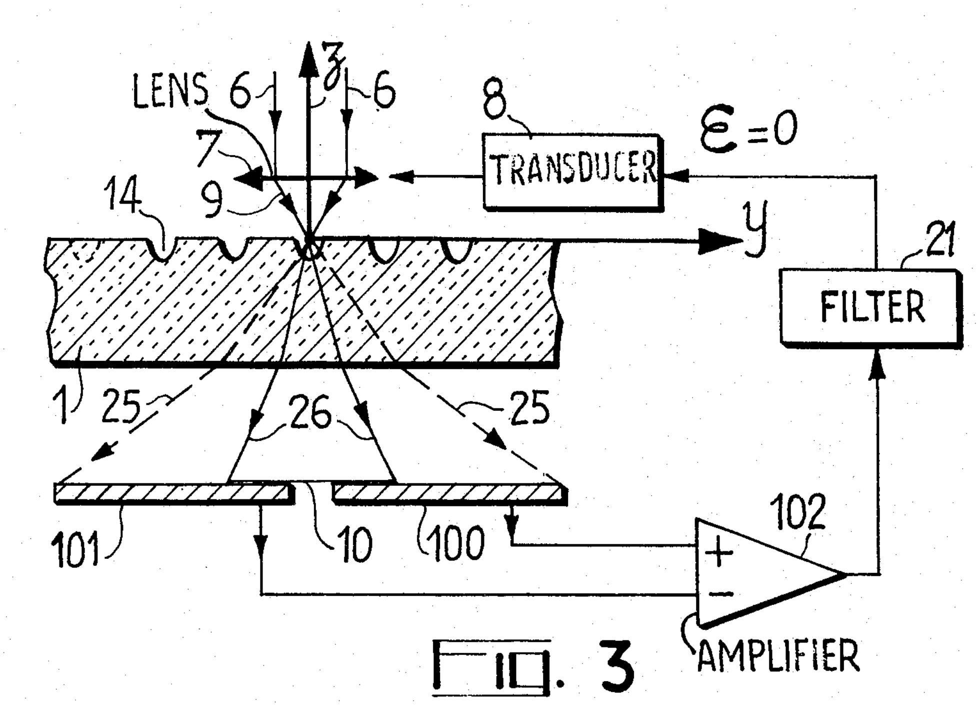
FIGS. 3 and 4 are section views, respectively showing the two pairs of photodetector elements utilised to detect surface irregularities.

FIG. 3 is a sectional view in the plane YOZ, showing the substrate 1 with the diffractive elements 14 and the detectors 100 and 101; the read-out beam 9, in the absence of any diffractive elements, is transmitted without diffraction, along a trajectory delimited by the rays 26, to the photodetectors 100 and 101, where it illuminates the zone marked 10; when the beam 9 is in a correctly centred position, of one of the elements 14, it is diffracted in accordance with a trajectory defined by the rays 25 which are symmetrical vis-a-vis the axis OZ, such that the zones of illumination of the photodetectors 100 and 101 have the same area, resulting in a zero error signal $\epsilon$.

In the case, (not shown) where the position of the beam 9 is eccentric in relation to the diffractive element, the zones of illumination of the photodetectors 100 and 101 will not be symmetrical so that an error signal $\epsilon$ other than zero will be produced; this signal, through the agency of a transducer 8, corrects the position of the objective lens 7. This situation is identical to that illustrated in FIG. 1, but the photodetectors 12 and 13 are respectively replaced by the photodetectors 101 and 100 here.

Figure 4:
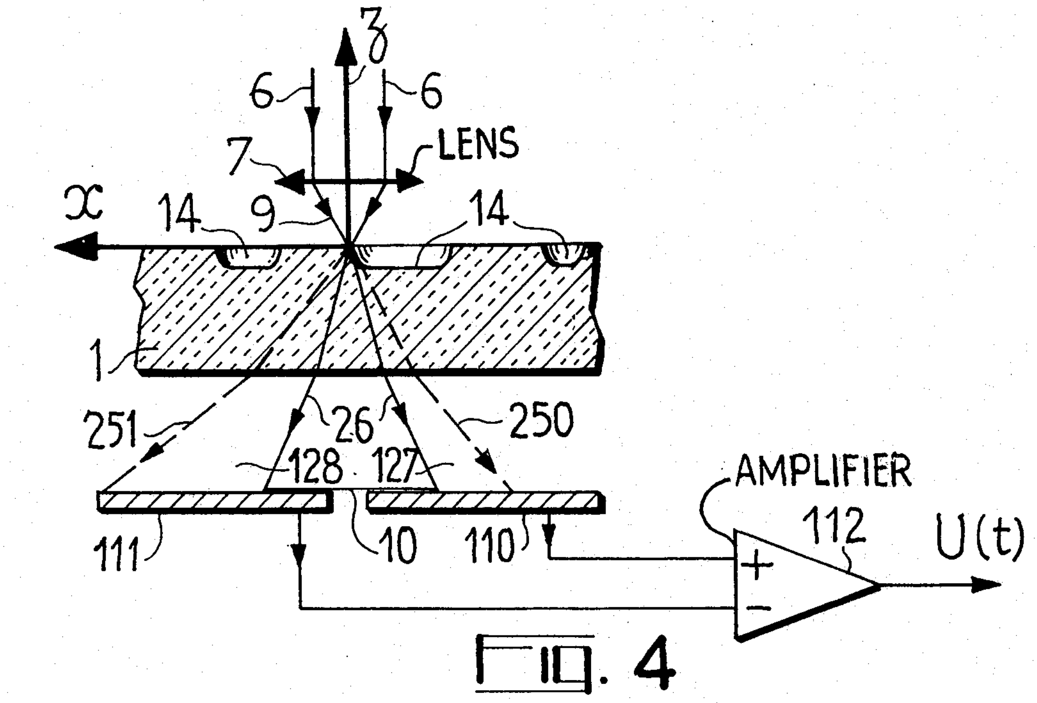

FIG. 4 is a sectional view in the plane XOZ, of the optical reproduction system in accordance with the invention, showing the substrate 1, the objective lens 7, the detectors 110 and 111 and differential amplifier 112.

In this figure, as in the preceding one, the light rays 26 limiting the read-out light beam 9 are transmitted by the substrate 1 in undiffracted form, so that it thus illuminates the zone 10 symmetrically distributed on the two photodetectors 110 and 111. The signal U($t$) furnished in this case by the differential amplifier 112, to which said photodetectors are connected, is thus zero.

If, as shown in the figure, the read-out beam 9 illuminates the edge of a diffractive element 14, the beam is diffracted along a trajectory limited by rays such as those marked 250 and 251, which are asymmetric in relation to the axis OZ; each of the photodetectors 110 and 111 is thus subjected to a variation in illumination, illustrated by the zones 127 and 128, respectively, which are not identical. The signal U($t$) furnished in this case by the differential amplifier 112 is no longer zero but represents the passage of the first of the ends of the diffractive element 14, the track moving in the direction $\overrightarrow{OX}$.

When the read-out beam illuminate the second end of the same diffractive element, the signal U($t$), varies in the opposite direction to that which it exhibited on passage of the first end, after having passed through a zero value corresponding in respect of the read-out beam to a central position in relation to said two ends.

The signal U($t$) is thus representative of the information carried by the diffractive elements 14; in other words, it is an alternating signal in which, in particular, the time interval separating two successive peaks of opposite polarities, corresponds either to the length of the diffractive element or to the length between two successive diffractive elements; one of these lengths is identified as a function of the order of succession of the positive and negative peaks.

This device has the advantage, in particular, of effecting detection of diffractive elements irrespective of their length, and of thus just as readily detecting elongated elements as elements whose lengths are close to their width.

In addition, the optical reproduction system described hereinbefore has been descussed in the context of read-out by transmission through transparent substrate (1). In a similar way, the device described in the present invention could be applied to the case of read-out by reflection of the information contained in the substrate.

What we claim is:

1. A reproducing device for the reading-out of a pulse time modulated waveform stored onto a record in the form of an embossed print having an axis, and carried by an engraved face of said record; said print being of uniform width, and constituted along said axis by a succession of diffractive elements having non-uniform length and spacing at least equal to said width; said reproducing device comprising: illumination means for projecting a concentrated spot of radiant energy onto said embossed print, photoelectric detection means arranged for selectively collecting the diffracted radiant energy emerging from the portion of said embossed print illuminated by said concentrated spot, and moving means arranged for following with said concentrated spot the path of said embossed print; said photoelectric detection means comprising four photodetector elements arranged side by side and supplied symmetrically with said diffracted radiant energy; the two first of said photodetectors elements being disposed symmetrically in relation to a first plane normal to said axis; the two second of said photodetector elements being disposed symmetrically in relation to a second plane normal to said first plane.

2. A reproducing device as claimed in claim 1, wherein said photoelectric detection means are associated with amplifier means; said amplifier means comprising at least one differential amplifier; said first two photodetector elements being respectively connected to the two inputs of said differential amplifier for supplying an electrical signal indicating the passage through said spot of one of said diffractive elements.

3. A reproducing device as claimed in claim 1, wherein said photoelectric detection means are associated with amplifier means; said amplifier means comprising at least one differential amplifier; said two second photodetector elements being respectively connected to the two inputs of said differential amplifier for supplying an error signal representative of the eccentricity of said spot in relation to said diffractive elements; said illumination means comprising an objective lens associated with an electromechanical transducer designed to displace said objective lens perpendicularly to said axis and at a constant distance from said record; said electromechanical transducer being controlled, by said error signal.

* * * * *